(12) United States Patent
Lee et al.

(10) Patent No.: US 7,965,302 B2
(45) Date of Patent: Jun. 21, 2011

(54) GAMMA CONVERSION SYSTEM

(75) Inventors: Hsin-Hung Lee, Kaohsiung Shien (TW);
Yu-Hsiang Huang, Taipei Shien (TW);
Yu-Wen Huang, Taipei Shien (TW);
Wan-Ching Lee, Taipei Shien (TW)

(73) Assignee: Quanta Computer Inc., Kuei Shan Hsiang, Tao Yuan Shien (TW)

( * ) Notice: Subject to any disclaimer, the term of this patent is extended or adjusted under 35 U.S.C. 154(b) by 959 days.

(21) Appl. No.: 11/812,642

(22) Filed: Jun. 20, 2007

(65) Prior Publication Data
US 2008/0117228 A1 May 22, 2008

(30) Foreign Application Priority Data
Nov. 22, 2006 (TW) .............................. 95143123 A

(51) Int. Cl.
*G09G 5/02* (2006.01)
(52) U.S. Cl. ........ 345/605; 345/589; 345/590; 345/600; 345/602; 348/254; 382/167
(58) Field of Classification Search .................... None
See application file for complete search history.

(56) References Cited

U.S. PATENT DOCUMENTS

| | | | | |
|---|---|---|---|---|
| 6,965,389 | B1 * | 11/2005 | Masuji et al. | 345/690 |
| 7,002,594 | B2 * | 2/2006 | Yoshida et al. | 345/600 |
| 7,061,504 | B1 * | 6/2006 | Glen | 345/600 |
| 7,391,480 | B2 * | 6/2008 | Fukue et al. | 348/675 |

* cited by examiner

*Primary Examiner* — Antonio A Caschera
(74) *Attorney, Agent, or Firm* — Thomas | Kayden

(57) ABSTRACT

The invention provides a Gamma conversion system applied on a source of image pixel data. Each image pixel data in the source of image pixel data has an M-bit pixel value with a first Gamma exponent. The Gamma conversion system comprises a storage module, a processing module, and a selecting module. The storage module therein stores I look-up tables. The processing module is respectively coupled to the source of image pixel data and the storage module, and the processing module comprises I converting modules, each of the converting modules corresponds to one look-up table. The selecting module is coupled to the source of image pixel data and the processing module respectively, and generates a selection signal according to the M-bit pixel value. In response to the selection signal, the processing module assigns one of the converting modules to convert the M-bit pixel value into an N-bit pixel value with a second Gamma exponent according to the look-up table corresponding to the assigned converting module.

10 Claims, 6 Drawing Sheets

| M-bit pixel value (inputted gray level) | N-bit pixel value (outputted gray level) | | | | | | | | | | | | | |
|---|---|---|---|---|---|---|---|---|---|---|---|---|---|---|
| | 14 | 13 | 12 | 11 | 10 | 9 | 8 | 7 | 6 | 5 | 4 | 3 | 2 | 1 |
| 0~63 | 0 | 0 | 0 | 0 | outputted gray level of the first look-up table | | | | | | | | | 1 |
| 64~127 | 0 | 0 | 0 | outputted gray level of the second look-up table | | | | | | | | | 0 | 0 |
| 128~255 | 0 | 0 | outputted gray level of the third look-up table | | | | | | | | | 0 | 0 | 0 |

FIG. 5

GAMMA CONVERSION SYSTEM

BACKGROUND OF THE INVENTION

1. Field of the Invention

This invention relates to a Gamma conversion system, and more particularly, relates to a Gamma conversion system utilizing look-up tables to perform Gamma conversion and the related conversion method.

2. Description of the Prior Art

In a display system, the relation between the gray level of a pixel displayed on the panel and its corresponding inputted pixel data is non-linear; the relation can be represented by a parameter, referred to as Gamma. The aforementioned relation can be shown as a function of a non-linear curve. If an inputted pixel data is x, the gray level of the pixel will be $x^\gamma$, wherein $\gamma$ is a Gamma exponent. The Gamma exponent of a cathode-ray tube (CRT) which was commonly used is about 2.2. In order to provide a linear relation for further processing between an inputted pixel data and a corresponding reproduced pixel data, the inputted pixel data to the 0.45 power is first calculated. The method above is usually called a Gamma conversion with a Gamma exponent equal to 0.45. With the Gamma conversion that fits the Gamma character of a CRT, the relation between the inputted pixel data and reproduced pixel data displayed on the CRT can be linear.

There are two conventional Gamma conversion methods for generating the gray level corresponding to an inputted pixel data; the first one utilizes digital signal processing performing a gray level function and the second one utilizes a look up table. The first method takes much time in calculation, so the second method is commonly adopted. In the second method, gray levels before conversion and after conversion are previously calculated and stored into a look up table in firmware. When a machine is turned on, the table will be downloaded by a micro-controller unit to a corresponding memory. When Gamma conversion is needed, a gray level before conversion can be regarded as a destination index, and a gray level after conversion can be read out from the table according to the destination index. The utilization of a look-up table takes less time than that taken by digital signal processing.

Referring to FIG. 1, FIG. 1 is a schematic diagram illustrating the system structure of a display system 1. In FIG. 1, an image processing system 10 comprises an inverse Gamma conversion module 12, a signal processing module 14, and a Gamma conversion module 16. Gamma exponent of the image pixel data inputted from the broadcasting system receiving point 11 is 0.45. However, the image processing in the signal processing module 14 must be under linear situation (i.e. Gamma exponent of the image pixel data is 1). Therefore, in the beginning, inverse Gamma conversion module 12 performs inverse Gamma conversion with Gamma exponent equal to 2.2 on the image pixel data, such that the Gamma exponent of the image pixel data after conversion is 1. Afterward, the signal processing module 14 processes the image pixel data. Then, in order to fit the Gamma character of the image pixel data with the panel 18, Gamma conversion module 16 performs a Gamma conversion with Gamma exponent equal to 0.45 on the image pixel data. Finally, the image pixel data is outputted to the panel 18.

In order to provide smooth colors, inverse Gamma conversion module 12 converts the format of the image pixel data as well. In general, image pixel data of the broadcasting system receiving point 11 can be the format of 8-bit or 10-bit. The 8-bit image pixel data is taken as an example for explanation. The conversion, which converts an image pixel data with fewer bits to an image pixel data with more bits (for instance, converting an 8-bit image pixel data to a 12-bit image pixel data) is called color level raise. In order to raise the accuracy of gray levels, color level raise is commonly adopted.

Then, referring to FIG. 2A and FIG. 2B, FIG. 2A is a conversion curve of the inverse Gamma conversion module 12 of FIG. 1. FIG. 2B is a conversion curve of Gamma conversion module 16 of FIG. 1. The conversion curve in FIG. 2A is a case which has 8-bit in, 14-bit out, and Gamma exponent equal to 2.2. The conversion curve in FIG. 2B is a case which has 14-bit in, 8-bit out, and Gamma exponent equal to 0.45. As shown in FIG. 2A and FIG. 2B, lower gray levels of the two kinds of Gamma conversion both has the problems of color banding, hue losing, or gray distortion.

Table 1 is a look-up table showing a Gamma conversion with 8-bit in, 12-bit out, and a Gamma exponent equal to 2.2 according to prior art. Table 1 only shows a part of lower gray levels. The conversion formula utilized in Table 1 is prior art. For example, U.S. Pat. No. 5,196,924 discloses a relative conversion formula, so the formula will not be described here in detail.

TABLE 1

| inputted value | outputted value |
| --- | --- |
| 0 | 0 |
| 1 | 0 |
| 2 | 0 |
| 3 | 0 |
| 4 | 0 |
| 5 | 1 |
| 6 | 1 |
| 7 | 2 |
| 8 | 2 |
| 9 | 3 |
| 10 | 3 |
| 11 | 4 |
| 12 | 5 |
| 13 | 6 |
| 14 | 7 |
| 15 | 8 |
| 16 | 9 |
| 17 | 11 |
| 18 | 12 |
| 19 | 14 |

Table 2 is a look-up table showing a Gamma conversion with 12-bit in, 8-bit out, and a Gamma exponent equal to 0.45 according to prior art. The table only shows a part of lower gray levels.

TABLE 2

| inputted value | outputted value |
| --- | --- |
| 0 | 0 |
| 1 | 6 |
| 2 | 8 |
| 3 | 10 |
| 4 | 11 |
| 5 | 12 |
| 6 | 14 |
| 7 | 14 |
| 8 | 15 |
| 9 | 16 |
| 10 | 17 |
| 11 | 18 |
| 12 | 18 |
| 13 | 19 |
| 14 | 20 |
| 15 | 20 |

TABLE 2-continued

| inputted value | outputted value |
|---|---|
| 16 | 21 |
| 17 | 22 |
| 18 | 22 |
| 19 | 23 |

As shown in Table 1, in prior art, when the Gamma conversion with Gamma exponent equal to 2.2 is performed, different inputted values may correspond to the same outputted value. In other words, even if the inputted gray level is changed, the corresponding outputted gray level may not be changed as well. Therefore, gray distortion is generated. As shown in Table 2, in prior art, with the Gamma conversion with Gamma exponent equal to 0.45, when the inputted gray level is 0 and 1, the corresponding outputted gray level is 0 and 6, respectively. That means, even a panel is capable of showing gray levels ranging from 1 to 5, these gray levels are never shown on the panel because of Gamma conversion. The situation of color banding will cause contour situations of the image displayed on the panel.

Relative designers care much about and have tried to overcome the aforesaid problems. Generally, a Gamma conversion with more bits (e.g. 14-bit or 16-bit) is utilized for getting higher accuracy. However, the look-up table with more bits occupies larger memory. Therefore, the invention is provided to improve the disadvantages of prior art.

SUMMARY OF THE INVENTION

The scope of the invention is to provide a Gamma conversion system and conversion method thereof. According to the Gamma conversion system and method of the invention, the Gamma conversion is performed on the inputted pixel data by utilizing a plurality of look-up tables. Thus, an accuracy equivalent to that of a multi-bit Gamma conversion is achieved, and less memory is occupied.

The Gamma conversion system of a preferred embodiment according to the invention is applied on a source of image pixel data. Each image pixel data in the source of image pixel data has an M-bit value with a first Gamma exponent, wherein M is an integer larger than 1. The Gamma conversion system comprises a storage module, a processing module, and a selecting module. The storage module therein stores I look-up tables, and I is an integer larger than 1. The processing module is respectively coupled to the source of image pixel data and the storage module. The processing module comprises I converting modules, and each of the I converting modules corresponds to one of the I look-up tables respectively. The selecting module is respectively coupled to the source of image pixel data and the processing module. The selecting module generates a selection signal according to the M-bit pixel value. In response to the selection signal, the processing module assigns one of the I converting modules. The assigned converting module converts the M-bit pixel value to an N-bit pixel value with a second Gamma exponent according to the look-up table corresponding to the assigned converting module, wherein N is an integer larger than 1.

In the Gamma conversion method according to the invention, the image pixel data is first received, and a selection signal is generated according to the M-bit pixel value of the image pixel data. Afterward, in response to the selection signal, one of the I converting modules is assigned to convert the M-bit pixel value. At last, an M-bit pixel value is converted to an N-bit pixel value by the assigned converting module and the look-up table corresponding to the assigned converting module.

The advantage and spirit of the invention may be understood by the following recitations together with the appended drawings.

BRIEF DESCRIPTION OF THE APPENDED DRAWINGS

FIG. 5 is a schematic diagram showing an embodiment of the inverse Gamma conversion being performed on an image pixel data according to the Gamma conversion system and method of the invention.

DETAILED DESCRIPTION OF THE INVENTION

The invention provides a Gamma conversion system and method. The preferred embodiments of the invention are disclosed as following.

Figure 3:
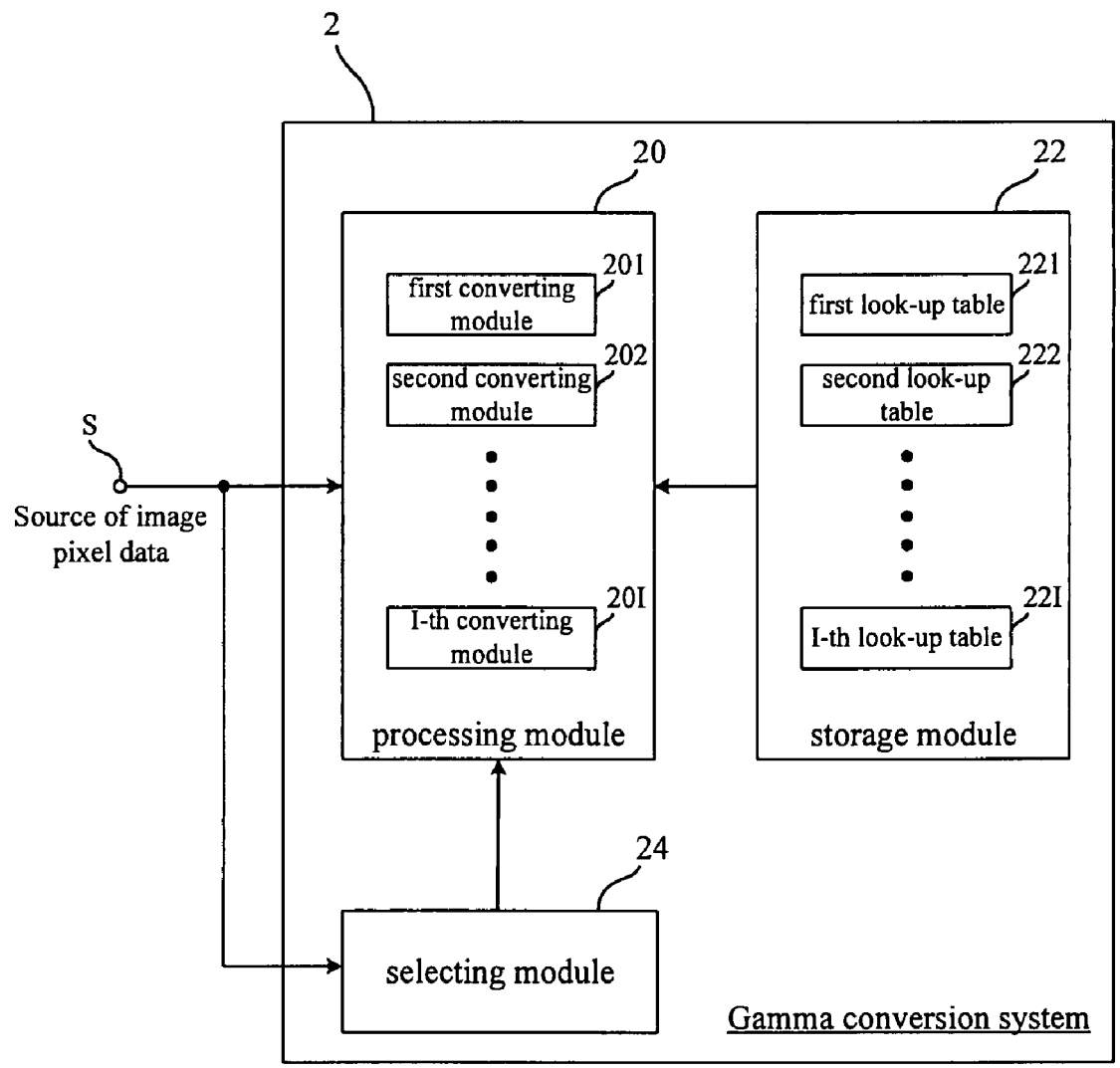
FIG. 3 is a schematic diagram illustrating the system structure of the Gamma conversion system according to a preferred embodiment of the invention.

Referring to FIG. 3, FIG. 3 is a schematic diagram illustrating the system structure of the Gamma conversion system 2 according to a preferred embodiment of the invention. As shown in FIG. 3, a Gamma conversion system 2 is applied on a source of image pixel data (S). Each image pixel data of the source of image pixel data S has an M-bit pixel value with a first Gamma exponent, wherein M is an integer larger than 1.

As shown in FIG. 3, the Gamma conversion system 2 comprises a storage module 22, a processing module 20, and a selecting module 24. The storage module 22 therein stores I look-up tables (the first look-up table 221 through the I-th look-up table 22I), wherein I is an integer larger than 1. The processing module 20 is respectively coupled to the source of image pixel data S and the storage module 22. The processing module 20 comprises I converting modules (the first converting module 201 through the I-th converting module 20I). Each of the I converting modules (the first converting module 201, the second converting module 202, . . . , the I-th converting module 20I) respectively corresponds to one of the I look-up tables (the first look-up table 221, the second look-up table 222, . . . , the I-th look-up table 22I). The selecting module 24 is coupled to the source of image pixel data S and the processing module 20 respectively. The selecting module 24 can generate a selection signal according to the M-bit pixel value. The processing module 20 assigns one of the I converting modules to converts the M-bit pixel value in response to the selection signal. The assigned converting module converts the M-bit pixel value to an N-bit pixel value with a second Gamma exponent according to the look-up table corresponding to the assigned converting module, wherein N is an integer larger than 1.

Figure 1:
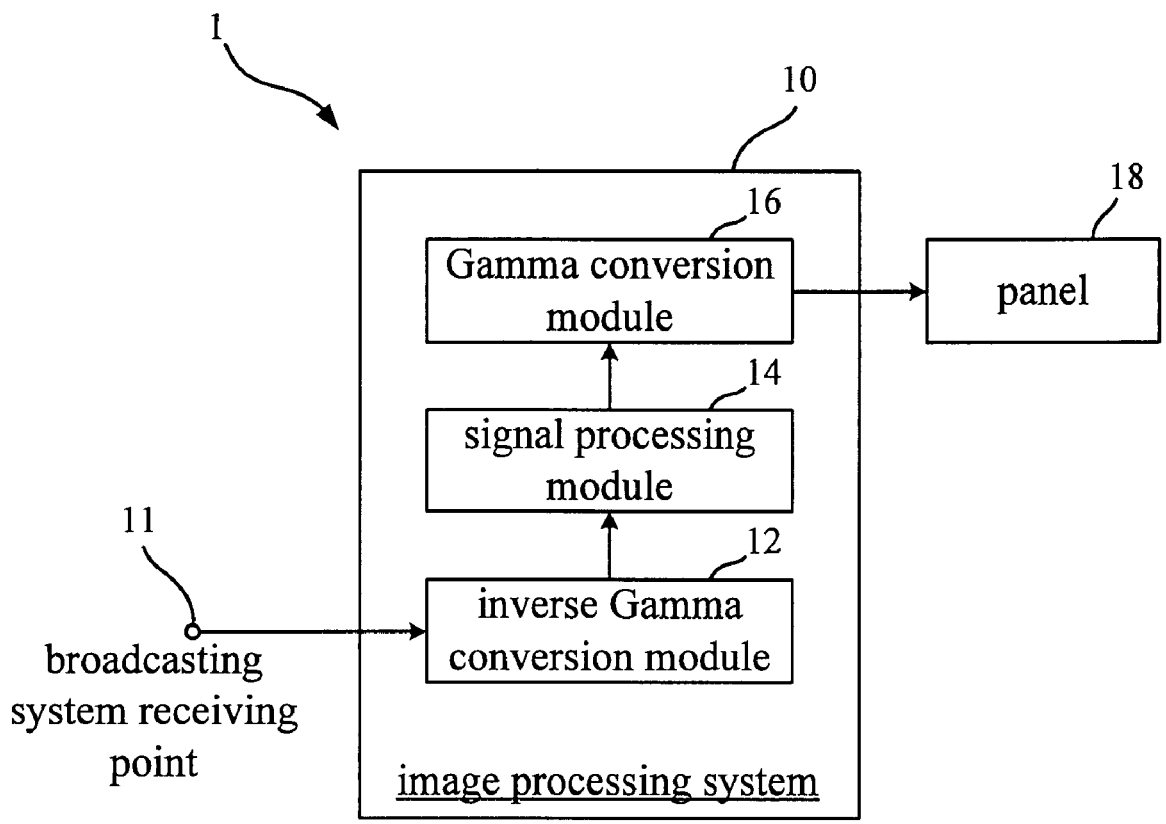
FIG. 1 is a schematic diagram illustrating the system structure of a display system.
Figure 2A:
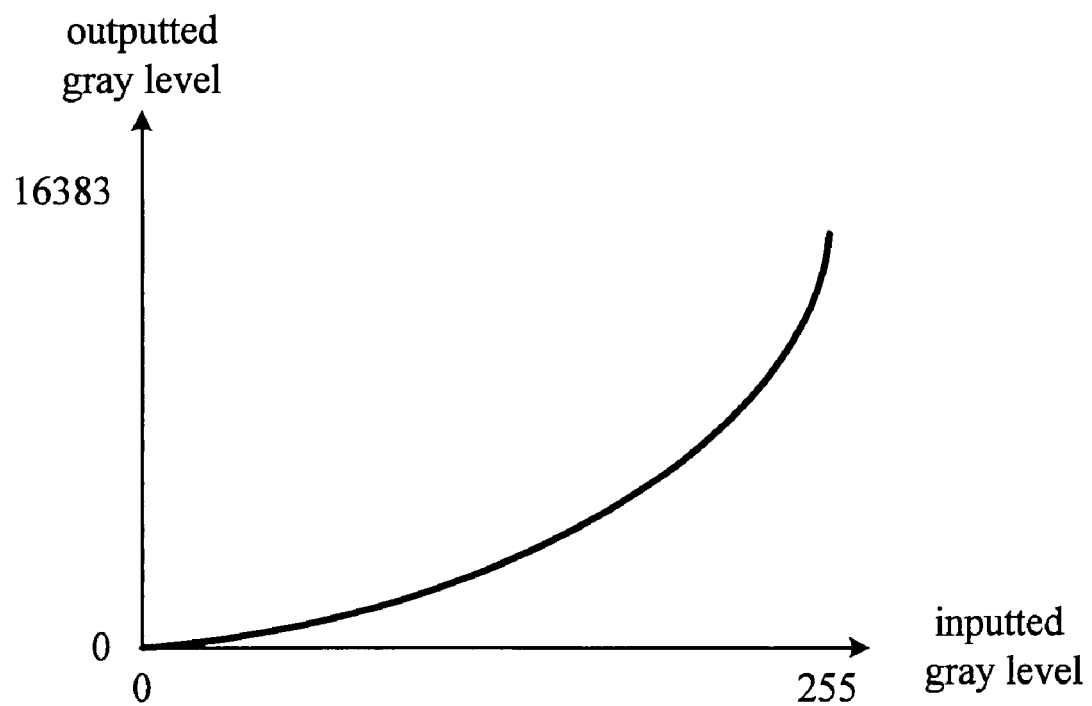
FIG. 2A is a conversion curve of the inverse Gamma conversion module of FIG. 1.
Figure 2B:
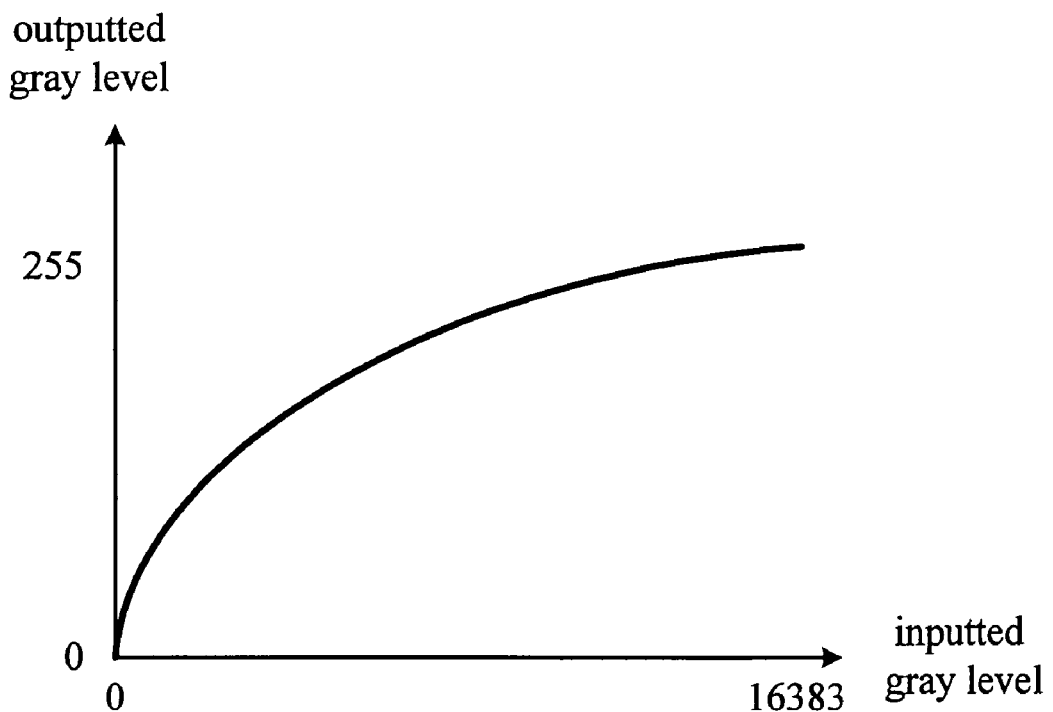
FIG. 2B is a conversion curve of the Gamma conversion module of FIG. 1.

In an embodiment, N is larger than M, for example, M=8 and N=10, 12, 14, or 16, or M=10 and N=12, 14, or 16. Each of the I look-up tables records successive K bits in the N-bit pixel value, wherein K is an integer ranging from 2 to (N−1). Each of the I converting modules comprises a multiplexer (not shown in FIG. 3) for respectively filling a value equal to zero in bits of the N-bit pixel value except the successive K bits. In the embodiment, the Gamma conversion system 2 can be regarded as the inverse Gamma conversion module 12 shown in FIG. 1. The determination procedure and the meaning of the successive K bits in the N-bit pixel value will be explained in detail in the following.

Figure 4:
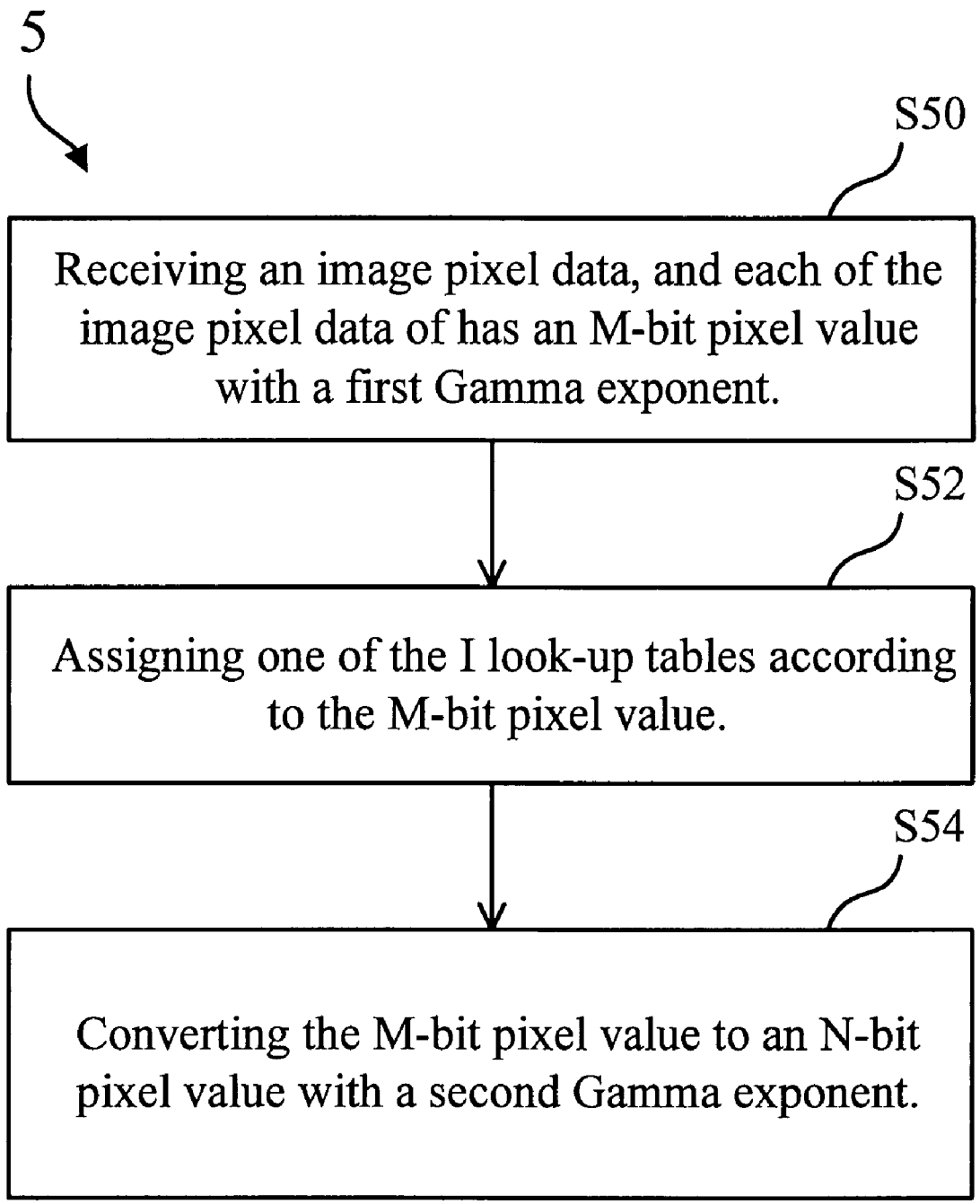
FIG. 4 is a flow chart showing a Gamma conversion method according to a preferred embodiment of the invention.

Referring to FIG. 4, FIG. 4 is a flow chart showing a Gamma conversion method 5 according to a preferred embodiment of the invention. The Gamma conversion method 5 is used for performing Gamma conversion on an image pixel data according to I pre-provided look-up tables, wherein I is an integer larger than 1. The image pixel data has an M-bit value with a first Gamma exponent, wherein M is an integer larger than 1.

In the beginning, according to the Gamma conversion method 5 of the invention, step S50 is performed to receive the image pixel data. Each of the image pixel data has an M-bit pixel value with a first Gamma exponent.

Afterward, according to the Gamma conversion method 5 of the invention, step S52 is performed to assign one of the I look-up tables according to the M-bit pixel value.

At last, according to the Gamma conversion method 5 of the invention, step S54 is performed to convert the M-bit pixel value of the image pixel data to an N-bit pixel value with a second Gamma exponent according to the assigned look-up table, wherein N is an integer larger than 1.

In an embodiment, N is larger than M, for example, M=8 and N=10, 12, 14, or 16, or M=10 and N=12, 14, or 16. Each of the I look-up tables records successive K bits in an N-bit pixel value, wherein K is an integer ranging from 2 to (N−1). The Gamma conversion method 5 further comprises a step of respectively filling a value equal to zero in bits of the N-bit pixel value except the successive K bits. In the embodiment, the Gamma conversion method 5 can be regarded as performed in the inverse Gamma conversion module 12 shown in FIG. 1. The determination procedure and the meaning of the successive K bits in the N-bit pixel value will be explained in detail in the following.

In order to further explain the system and the method of the invention, two embodiments of Gamma conversion of image pixel data are provided as following. The following embodiments are used only to illustrate the method of the invention, and not used to limit the scope of the invention.

Referring to FIG. 5, FIG. 5 is a schematic diagram showing an embodiment of the inverse Gamma conversion being performed on an image pixel data according to the Gamma conversion system and method of the invention. The embodiment shows an inverse Gamma conversion with 8-bit in and 14-bit out performed on an 8-bit image pixel data with Gamma exponent equal to 0.45 to output a 14-bit image pixel data with Gamma exponent equal to 1. In this embodiment, M=8 and N=14.

As shown in FIG. 5, in the embodiment, the 8-bit gray level is first divided into three parts: 0~63, 64~127, and 128~225. Each of the three parts respectively corresponds to one converting module which corresponds to one look-up table. In the embodiment, a first converting module, a second converting module, and a third converting module respectively correspond to a first look-up table, a second look-up table, and a third look-up table.

When an inputted 8-bit gray level is in the range from 0 to 63, due to the gray level after conversion is not large, the most significant four bits would be zero. Thus, the bits recorded in the look-up table actually are the least significant 10 bits of the 14-bit gray level and the most significant four bits are filled with a value equal to zero respectively, so as to generate a 14-bit gray level. Therefore, when the inputted 8-bit gray level is in the range from 0 to 63, the first through the tenth bits of the 14-bit gray level outputted after the Gamma conversion can be found out from the first look-up table, and the eleventh through the fourteenth bits are respectively filled with a value equal to zero.

In the system structure shown in FIG. 3, when the selecting module 24 determines the gray level of an 8-bit (M-bit) pixel is in the range from 0 to 63, a selection signal is generated, and the selection signal can assign the first converting module 201 to convert the inputted 8-bit (M-bit) gray level to a 14-bit (N-bit) gray level. The first converting module 201 can find out the first through the tenth bits of the outputted pixel data from the first look-up table 221. Additionally, the first converting module comprises a multiplexer which respectively fills a value equal to zero in the eleventh through the fourteenth bits.

Due to the sensitivity of human eyes in the gray level ranging from 64 to 127 is lower, the least significant two bits can be ignored (the largest error is ±0.012%) when an inputted 8-bit gray level is in the range from 64 to 127. The bits recorded in the look-up table actually are the third through the twelfth bits of the 14-bit gray level while the most significant two bits (the thirteenth bit and the fourteenth bit) and the least significant two bits (the first bit and the second bit) are respectively filled with a value equal to zero, so as to generate a 14-bit gray level. Therefore, when the inputted 8-bit gray level is in the range from 64 to 127, the third through the twelfth bits of the 14-bit gray level outputted after the Gamma conversion can be found out from the second look-up table; and the first bit, the second bit, the thirteenth bit, and the fourteenth bit are respectively filled with a value equal to zero.

In the system structure shown in FIG. 3, when the selecting module 24 determines the gray level of an 8-bit (M-bit) pixel is in the range from 64 to 127, a selection signal is generated. The selection signal can assign the second converting module 202 to convert the inputted 8-bit (M-bit) gray level to a 14-bit (N-bit) gray level. The second converting module 202 can find out the third through the twelfth bits of the outputted pixel data from the second look-up table 222. Additionally, the second converting module 202 comprises a multiplexer which respectively fills a value equal to zero in the first bit, the second bit, the thirteenth bit, and the fourteenth bit.

Due to the sensitivity of human eyes in the gray level ranging from 128 to 255 is the lowest, minor difference between gray levels is not easily sensed by human eyes when an inputted 8-bit-gray level is in the range from 128 to 255. The bits recorded in the look-up table actually are the fifth bit through the fourteenth bits of the 14-bit gray level (the largest error is ±0.09%) while the least significant four bits are filled with a value equal to zero respectively, so as to generate a 14-bit gray level. Therefore, when the inputted 8-bit gray level is in the range from 128 to 255, the fifth bit through the fourteenth bits of the 14-bit gray level outputted after the Gamma conversion can be found out from the third look-up table, the first through the fourth bits are respectively filled with a value equal to zero.

In the system structure shown in FIG. 3, when the selecting module 24 determines the gray level of an 8-bit (M-bit) pixel is in the range from 128 to 255, a selection signal is generated.

The selection signal can assign a third converting module to convert the inputted 8-bit (M-bit) gray level to a 14-bit (N-bit) gray level. The third converting module can find out the fifth bit through the fourteenth bits of the outputted pixel data from a third look-up table. Additionally, the third converting module comprises a multiplexer which respectively fills a value equal to zero in the first through the fourth bits.

In the aforesaid embodiments of the invention, 14-bit conversion accuracy can be achieved with three 10-bit look-up tables.

In another embodiment, M is larger than N, for example, M=16, 14, 12, or 10 and N=8, or M=16, 14, or 12 and N=10. The Gamma conversion system of the embodiment can be regarded as the Gamma conversion module 16 shown in FIG. 1.

Figure 6:
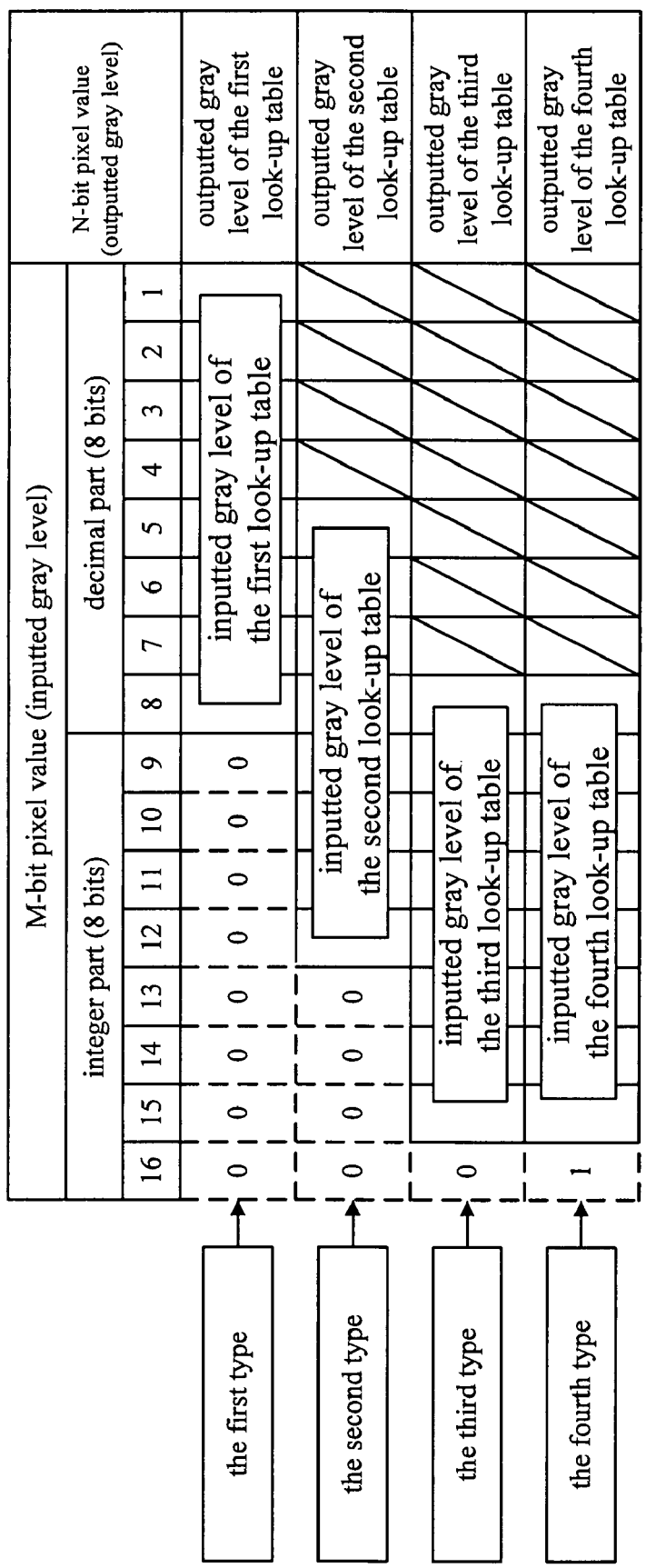
FIG. 6 is a schematic diagram showing an embodiment of the Gamma conversion being performed on an image pixel data according to the Gamma conversion system and method of the invention.

Referring to FIG. 6, FIG. 6 is a schematic diagram showing an embodiment of the Gamma conversion being performed on an image pixel data according to the Gamma conversion system and method of the invention. In the embodiment, a Gamma conversion with 16-bit in and 8-bit out is performed on a 16-bit image pixel data with Gamma exponent equal to 1 to output an 8-bit image pixel data with Gamma exponent equal to 0.45. In this embodiment, M=16 and N=8.

As shown in FIG. 6, in the embodiment, the 16-bit gray level is divided into an integer part and a decimal part. The integer part consists of the ninth through the sixteenth bits, and the decimal part consists of the first through the eighth bits. The 16-bit gray level can be classified into four types, and each of the types corresponds to one look-up table. In the embodiment, the first type corresponds to the first look-up table, the second type corresponds to the second look-up table, the third type corresponds to the third look-up table, and the fourth type corresponds to the fourth look-up table. Which type the 16-bit gray level belongs to is determined by all bits or some bits of the integer part. A priority relation between these types exists. If the 16-bit gray level belongs to two (or more) types according to the integer part at the same time, the type with higher priority is assigned to the 16-bit gray level. In the embodiment, the priority of the first type is higher than the priority of the second type; the priority of the second type is higher than the priority of the third type; the priority of the third type is higher than the priority of the fourth type.

Referring to FIG. 6, the bits with dotted frame are used for determining the type of the 16-bit gray level, and the bits with slash are unimportant in the determination procedure. When the bits in the integer part (from the ninth through the sixteenth bits) of the 16-bit gray level (inputted value) all are values equal zero, the 16-bit gray level belongs to the first type. When the thirteenth through the sixteenth bits of the 16-bit gray level all are values equal to zero, the 16-bit gray level belongs to the second type. When the sixteenth bit of the 16-bit gray level is a value equal to zero, the 16-bit gray level belongs to the third type. When the sixteenth bit of the 16-bit gray level is a value equal to one, the 16-bit gray level belongs to the fourth type. For example, if the 16-bit gray level is 0000000011111111, the 16-bit gray level belongs to the first, second, and third types at the same time according to the above determination rule. Because the priority of the first type is higher than the second and third types, the first type is assigned to the 16-bit gray level. Once which type the 16-bit gray level belongs to is determined, the 16-bit gray level will be converted according to the look-up table corresponding to the assigned type. In the embodiment of FIG. 6, N successive bits in the M-bit gray level are used as the input or parameter of the look-up table corresponding to the assigned type.

If a 16-bit gray level belongs to the first type, the first through the eighth bits of the 16-bit gray level are used as an input or parameter of the first look-up table and corresponds to an 8-bit output. There are $2^8$ numbers (0~255) of combination for the first through the eighth bits, so the first look-up table has 256 outputs corresponding to 256 inputs. For example, if a 16-bit gray level is "00000000-12345678", the 16-bit gray level is determined belonging to the first type according to the integer part. Therefore, the first through the eighth bits (12345678) are used as an input or parameter of the first look-up table, and an 8-bit corresponding output can be generated.

If a 16-bit gray level belongs to the second type, the fifth through the twelfth bits of the 16-bit gray level are used as an input or parameter of the second look-up table, and an 8-bit corresponding output is generated. There are $2^8$ numbers (0~255) of combination for the fifth through the twelfth bits, therefore, the second look-up table has 256 outputs corresponding to 256 inputs. The first through the fourth bits are unimportant. For example, if a 16-bit gray level is "0000-01011234-5678", the 16-bit gray level is determined belonging to the second type according to the integer part. Therefore, the fifth through the twelfth bits (01011234) are used as an input or parameter of the second look-up table, and an 8-bit corresponding output can be generated. The first through the fourth bits (5678) are unimportant (referring to the bits with slash in FIG. 6). In other words, all the 16-bit gray levels in the form of 0000-01011234-xxxx (x represents any number ranging from 0 to 9) correspond to the same outputted gray level. Only a bit in the range from the fifth through the twelfth bits is changed, the outputted gray level is changed accordingly.

If a 16-bit gray level belongs to the third type, the eighth through the fifteenth bits of the 16-bit gray level are used to be an input or parameter of the third look-up table, and an 8-bit corresponding output is generated. There are $2^8$ numbers (0~255) of combination for the eighth through the fifteenth bits, therefore, the third look-up table has 256 outputs corresponding to 256 inputs. The first through the seventh bits are unimportant. For example, if a 16-bit gray level is "0-01101011-2345678", the 16-bit gray level is determined belonging to the third type according to the integer part. Therefore, the eighth through the fifteenth bits (01101011) are used as an input or parameter of the third look-up table, and an 8-bit corresponding output can be generated. The first through the seventh bits (2345678) are unimportant. In other words, all the 16-bit gray levels in the form of 0-01101011-xxxx (x represents any number ranging from 0 to 9) correspond to the same outputted gray level. Only a bit in the range from the eighth through the fifteenth bits is changed, the outputted gray level is changed accordingly.

If a 16-bit gray level belongs to the fourth type, the eighth through the fifteenth bits of the 16-bit gray level are used as an input or parameter of the fourth look-up table, and an 8-bit corresponding output can be generated. There are $2^8$ numbers (0~255) of combination for the eighth through the fifteenth bits, therefore, the fourth look-up table has 256 outputs corresponding to 256 inputs. The first through the seventh bits are unimportant. For example, if a 16-bit gray level is "1-01101011-2345678", the 16-bit gray level is determined belonging to the fourth type according to the integer part. Therefore, the eighth through the fifteenth bits (01101011) are used as an input or parameter of the fourth look-up table, and an 8-bit corresponding output is generated. The first through the seventh bits (2345678) are unimportant. In other words, all the 16-bit gray levels in the form of 1-01101011-xxxx (x represents any number ranging from 0 to 9) correspond to the same outputted gray level. Only a bit in the range from the eighth through the fifteenth bits is changed, the outputted gray level is changed accordingly.

In the aforesaid embodiments of the invention, the 16-bit accuracy can be achieved with four 8-bit look-up tables.

Compared to prior art, it can be known, with the embodiments above, a multi-bit accuracy can be achieved in the invention with less memory. Accordingly, situations of gray distortion and blocking effect can be prevented.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A gamma conversion system applied to a source of image pixel data, each image pixel data in the source of image pixel data having an M-bit pixel value with a first gamma exponent, M being an integer larger than 1, the gamma conversion system comprising:
   a storage module therein storing I look-up tables, I being an integer larger than 1;
   a processing module, coupled to the source of image pixel data and the storage module respectively, the processing module comprising I converting modules which each corresponds to one of the I look-up tables; and
   a selecting module, coupled to the source of image pixel data and the processing module respectively, the selecting module generating a selection signal according to the M-bit pixel value;
   wherein in response to the selection signal, the processing module assigns one of the I converting modules to convert the M-bit pixel value, the assigned converting module converts the M-bit pixel value into an N-bit pixel value with a second gamma exponent according to the look-up table corresponding to the assigned converting module, wherein N is an integer larger than 1.

2. The gamma conversion system of claim 1, wherein N is larger than M.

3. The gamma conversion system of claim 2, wherein N=16, 14, 12, or 10, and M=8.

4. The gamma conversion system of claim 2, wherein N=16, 14, or 12, and M=10.

5. The gamma conversion system of claim 2, wherein the first gamma exponent is 0.45, and the second gamma exponent is 1.

6. The gamma conversion system of claim 1, wherein M is larger than N.

7. The gamma conversion system of claim 6, wherein M=16, 14, 12, or 10, and N=8.

8. The gamma conversion system of claim 6, wherein M=16, 14, or 12, and N=10.

9. The gamma conversion system of claim 6, wherein N successive bits in the M-bit pixel value is used to be input or parameter of the look-up table corresponding to the assigned converting module.

10. The gamma conversion system of claim 6, wherein the first gamma exponent is 1, and the second gamma exponent is 0.45.

* * * * *